(12) United States Patent
Kutalek et al.

(10) Patent No.: US 9,337,630 B2
(45) Date of Patent: May 10, 2016

(54) MEDIUM VOLTAGE SWITCHGEAR CONSTRUCTION USING SYMMETRIC SHEET METAL PARTS AND PANELS TO BUILD COMPARTMENT ASSEMBLIES AND SUBASSEMBLIES

(71) Applicant: ABB Technology AG, Zurich (CH)

(72) Inventors: Zdenek Kutalek, Brno-Kohoutovice (CZ); Stefano Motta, Besana Brianza (IT); Amar G. Kini, Lake Mary, FL (US); Frantisek Koudelka, Modrice (CZ)

(73) Assignee: ABB Technology AG, Zurich (CH)

( * ) Notice: Subject to any disclaimer, the term of this patent is extended or adjusted under 35 U.S.C. 154(b) by 38 days.

(21) Appl. No.: 14/174,910

(22) Filed: Feb. 7, 2014

(65) Prior Publication Data

US 2015/0229109 A1    Aug. 13, 2015

(51) Int. Cl.
*A47B 47/02*    (2006.01)
*H02B 13/02*   (2006.01)
*H02B 1/30*    (2006.01)
*H02B 1/01*    (2006.01)

(52) U.S. Cl.
CPC ............. *H02B 13/02* (2013.01); *H02B 1/301* (2013.01); *H02B 1/01* (2013.01); *Y10T 29/49826* (2015.01)

(58) Field of Classification Search
CPC ............. A47B 47/00; A47B 47/0025; A47B 47/0075; A47B 47/02; A47B 47/03
See application file for complete search history.

(56) References Cited

U.S. PATENT DOCUMENTS

| | | | | |
|---|---|---|---|---|
| 2,091,549 A * | 8/1937 | Kelso | ............. | 220/4.28 |
| 2,749,199 A * | 6/1956 | O'Connor | ............. | 312/257.1 |
| 3,110,535 A * | 11/1963 | Anderson | ............. | 312/350 |
| 6,283,565 B1 * | 9/2001 | Kohler et al. | ............. | 312/326 |
| 6,443,542 B1 | 9/2002 | Lindquist | | |
| 2005/0122013 A1 * | 6/2005 | Canin et al. | ............. | 312/265.1 |
| 2008/0238277 A1 * | 10/2008 | Geng | ............. | 312/326 |
| 2009/0026163 A1 * | 1/2009 | Lee | ............. | 211/189 |

FOREIGN PATENT DOCUMENTS

| | | |
|---|---|---|
| DE | 1429500 A1 | 11/1968 |
| DE | 19723555 A1 | 12/1998 |
| EP | 0399595 A1 | 11/1990 |

OTHER PUBLICATIONS

International Search Report and Written Opinion in PCT/US2015/012118 dated Apr. 13, 2015.

* cited by examiner

*Primary Examiner* — Daniel Rohrhoff
(74) *Attorney, Agent, or Firm* — Manelli Selter PLLC; Edward J. Stemberger

(57) ABSTRACT

Side panels for a compartment of a switchgear include a first panel structure and a second panel structure that is identical to the first panel structure. Each panel structure has a body with symmetric surface features in the body. Certain of the surface features are offset from a plane of symmetry of the body. The first panel structure is constructed and arranged to define a left side of the compartment and the second panel structure, upon proper orientation, is constructed and arranged to define an opposing, right side of the compartment.

7 Claims, 4 Drawing Sheets

MEDIUM VOLTAGE SWITCHGEAR CONSTRUCTION USING SYMMETRIC SHEET METAL PARTS AND PANELS TO BUILD COMPARTMENT ASSEMBLIES AND SUBASSEMBLIES

FIELD

The invention relates to medium voltage air insulated switchgears and, more particularly, to the use of symmetric sheet metal parts and panels to build compartment assemblies and subassemblies.

BACKGROUND

With reference to FIG. 1, a typical switchgear compartment construction features a left side panel 10 and a separate, non-identical right side panel 11 with non-symmetric feature patterns 12 and 14 for attaching internal parts. The requirement of two separate parts leads to higher costs, inventory and assembly complexity.

Thus, there is a need to provide symmetric sheet metal parts and panels to build compartment assemblies and subassemblies.

SUMMARY

An object of the invention is to fulfill the need referred to above. In accordance with the principles of the present invention, this objective is obtained by providing side panels for a compartment of a switchgear. The side panels include a first panel structure and a second panel structure that is identical to the first panel structure. Each panel structure has a body with symmetric surface features in the body. Certain of the surface features are offset from a plane of symmetry of the body. The first panel structure is constructed and arranged to define a left side of the compartment and the second panel structure, upon proper orientation, is constructed and arranged to define an opposing, right side of the compartment.

In accordance with another aspect of the disclosed embodiment, a method provides a compartment for a switchgear by providing a first panel structure and a second panel structure that is identical to the first panel structure. Each panel structure has a body with symmetric surface features in the body. Certain of the surface features are offset from a plane of symmetry of the body. The first panel structure is oriented to define one side of the compartment and the second panel structure is oriented to define an opposing side of the compartment so that at least some of the offset surface features are in alignment. At least one internal panel is coupled between the first panel structure and second panel structure using the aligned, offset surface features.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
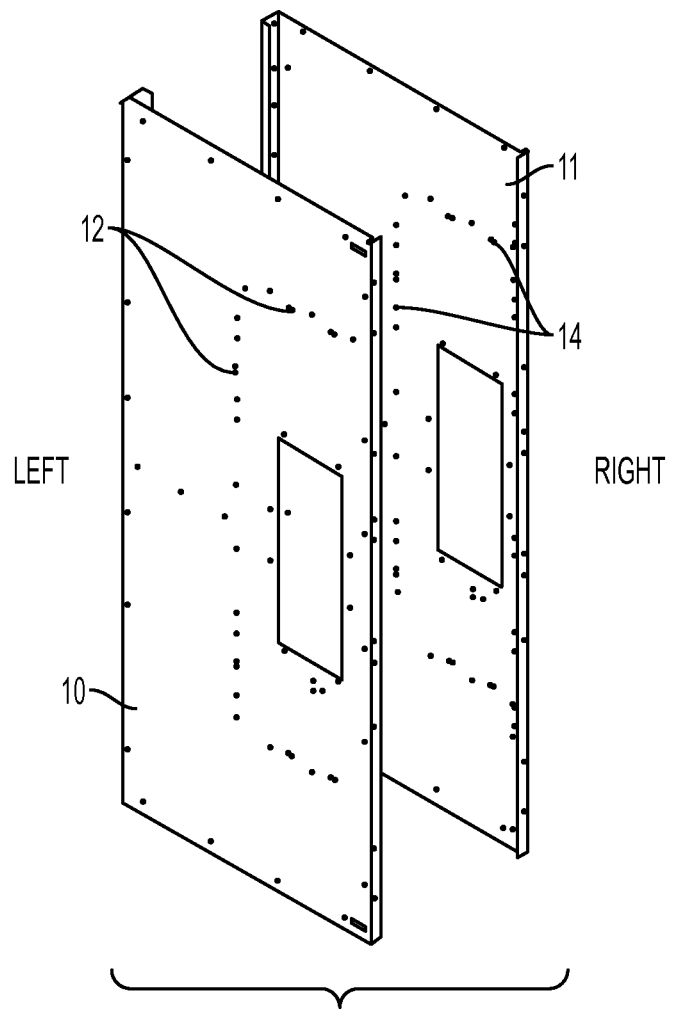
FIG. 1 is a perspective view of conventional, non-identical left and right side panels for a switchgear compartment.
Figure 2:
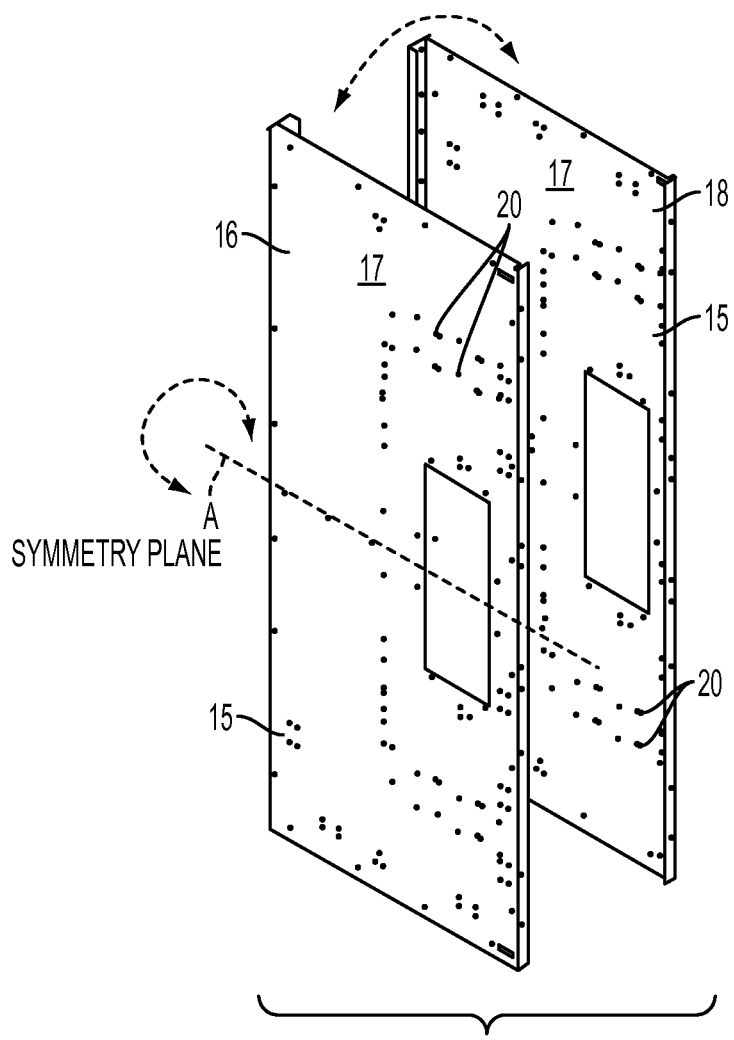
FIG. 2 is perspective view of a panel structure that defines identical left and right side panels for a switchgear compartment provided in accordance with an embodiment.

With reference to FIG. 2, a panel structure 15 is provided for construction of a Medium Voltage Switchgear compartment and subassemblies in accordance with an embodiment. The panel structure 15 has a sheet metal body 17 that is symmetric about an axis A (which is considered a plane of symmetry). The panel structure 15 includes symmetric surface features 20 like emboss, hole and cutout patterns so that a single part can be used for both a left side panel 16 and a right side panel 18 of a switchgear compartment. Thus, two identical panel structures 15 can be formed with one being used for the left side panel 16 of a compartment, with the other panel structure 15, after being flipped over about the axis A, being used for the opposing, right side panel 18 of the compartment.

Figure 3:
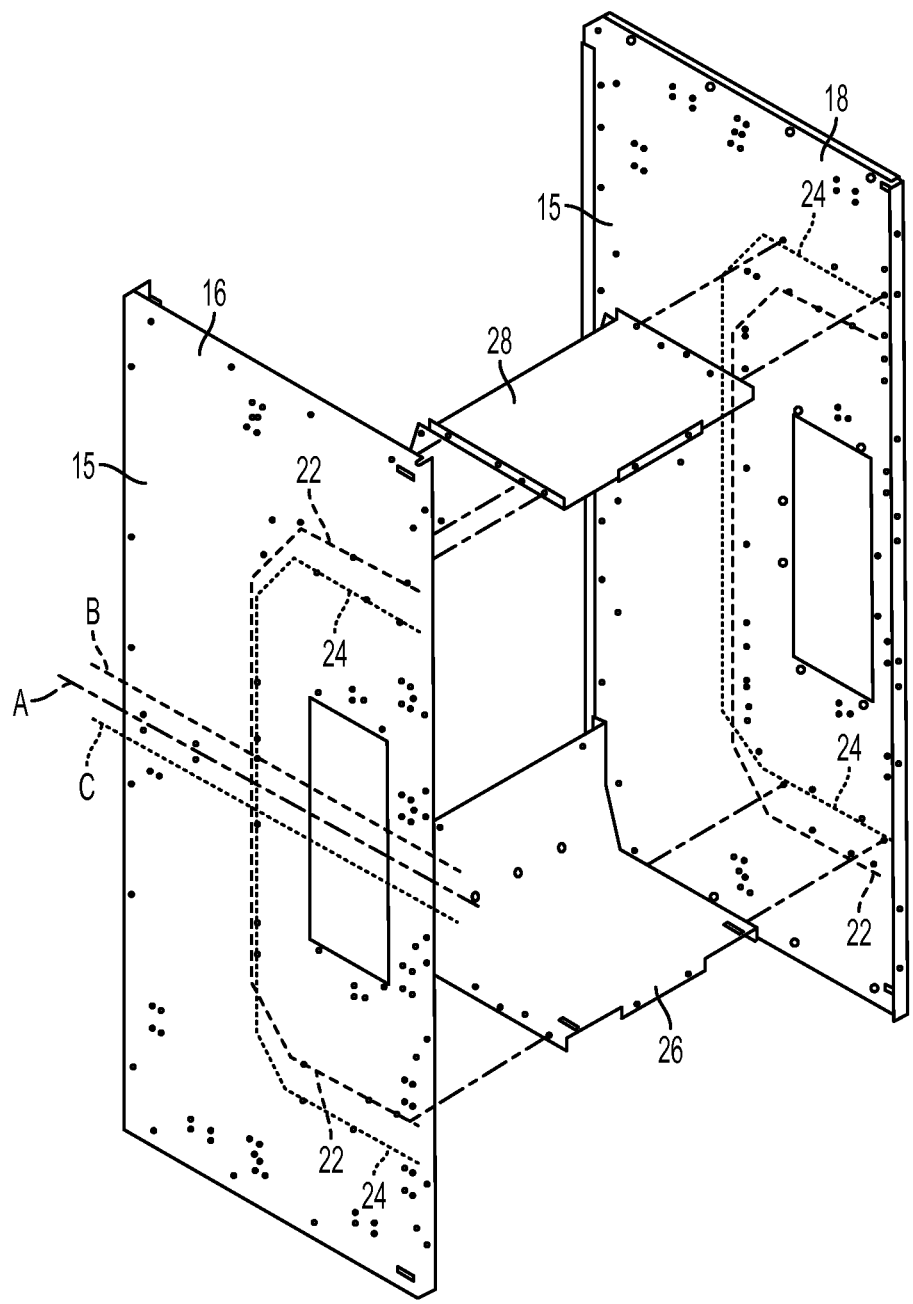
FIG. 3 is an exploded perspective view of a switchgear compartment employing the panel structures of FIG. 2.
Figure 4:
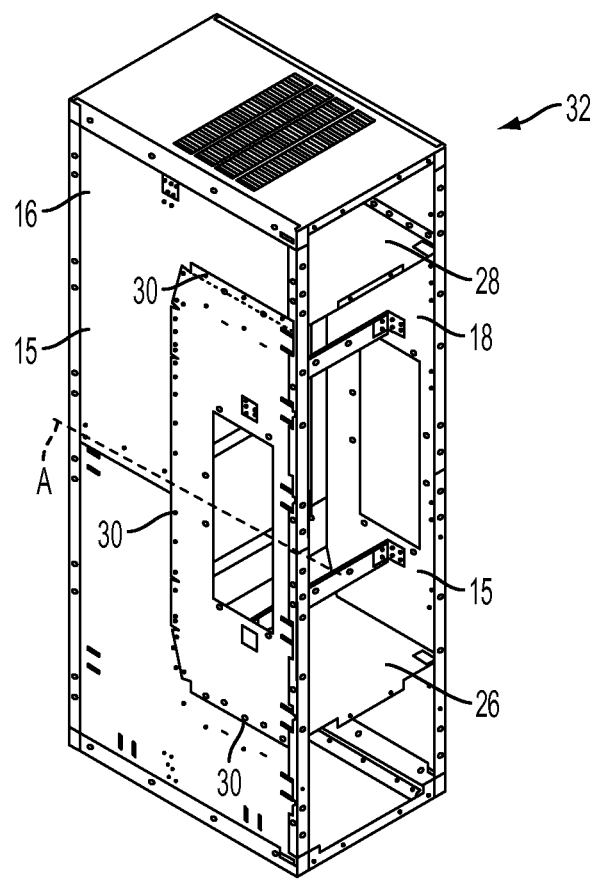
FIG. 4 is a perspective view of the switchgear compartment of FIG. 3, shown in an assembled state.

With reference to FIG. 3, additional surface features or patterns 22, 24 that are offset from the symmetry plane or axis A are provided for attaching panels 26, 28, respectively, that are not located equidistance from the plane of symmetry or axis A. In particular, the surface feature 22, shown by the long dashed line in FIG. 3, is symmetrical about axis B, which is offset, in a first direction, from axis A. Offset surface features 22 in the side panels 16 are aligned with offset surface features 24 in panel 18 to mount the internal panel 26 generally transversely with respect to the side panels 16, 18. The surface feature 24 shown by the short dashed line in FIG. 3 is symmetrical about axis C, which is offset, in a direction opposite the first direction, from axis A. Offset surface features 24 in the side panels 16 are aligned with offset surface features 22 in panel 18 to mount the internal panel 28 thereto. Fasteners 30 are installed at predetermined locations (e.g., using holes defining the corresponding aligned, offset surface features) to secure the sheet metal parts together so as to define the assembled compartment, generally indicated at 32, in FIG. 4.

The panel structure 15 is applicable to all switchgear compartments. Major advantages of the use of the panel structure 15 are faster assembly, lower cost, reduced parts count and inventory maintenance. This novel configuration eliminates the non-identical and specifically configured left and right side parts traditionally used in switchgear compartments.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. Panel structure for a compartment of a switchgear, the panel structure comprising:
   a first panel structure,
   a second panel structure identical to the first panel structure, each panel structure having a body with some surface features in the body being symmetrical about a first plane of the body, other surface features in the body being symmetrical about a second plane of the body that is offset from the first plane and parallel to the first plane, and further surface features in the body being symmetrical about a third plane of the body that is offset from the first plane and parallel to the first plane, with the first plane being disposed between the second and third planes, wherein the first panel structure is constructed and arranged to define a left side of the compartment and the second panel structure, upon proper orientation, being constructed and arranged to define an opposing, right side of the compartment, and an internal panel joining the first and second panel structures at a location of the surface features that are symmetrical about the second plane of the first panel, and at a location of said further surface features that are symmetrical about the third plane of the second panel.

2. The panel structure of claim 1, wherein the body is sheet metal.

3. The panel structure of claim 1, wherein the surface features symmetrical about the first plane are emboss, hole or cutout patterns.

4. The panel structure of claim 1, wherein the internal panel is coupled so as to be generally transverse with respect to the first and second panel structures.

5. A method of providing a compartment for a switchgear, the method comprising the steps of:

providing a first panel structure, providing a second panel structure identical to the first panel structure, each panel structure having a body with some surface features in the body being symmetrical about a first plane of the body, other surface features in the body being symmetrical about at least one second plane of the body that is offset from the first plane and parallel to the first plane, and further surface features in the body being symmetrical about a third plane of the body that is offset from the first plane and parallel to the first plane, with the first plane being disposed between the second and third planes, orienting the first panel structure to define one side of the compartment and orienting the second panel structure to define an opposing side of the compartment so that the surface features symmetrical about the second plane of the first panel are in alignment with said further surface features symmetrical about the third plane of the second panel, and coupling at least one internal panel between the first panel structure and second panel structure using the aligned, surface features.

6. The method of claim 5, wherein the aligned surface features are holes and the step of coupling includes using fasteners in the holes to couple the internal panel to the first and second panel structures.

7. The method of claim 5, wherein the internal panel is coupled so as to be generally transverse with respect to the first and second panel structures.

* * * * *